United States Patent
Richter et al.

(10) Patent No.: US 9,742,749 B1
(45) Date of Patent: Aug. 22, 2017

(54) LIVE STREAM ENCRYPTION

(71) Applicant: Amazon Technologies, Inc., Seattle, WA (US)

(72) Inventors: Stefan Christian Richter, Seattle, WA (US); Marc Joliveau, Seattle, WA (US); Chris Longo, Seattle, WA (US); Ryan Dell Olson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 14/860,455

(22) Filed: Sep. 21, 2015

(51) Int. Cl.
| | |
|---|---|
| *H04H 60/25* | (2008.01) |
| *H04L 29/06* | (2006.01) |
| *H04L 9/08* | (2006.01) |
| *H04W 12/04* | (2009.01) |
| *H04N 21/4627* | (2011.01) |
| *H04N 21/6587* | (2011.01) |
| *H04N 21/6377* | (2011.01) |
| *G06F 21/62* | (2013.01) |

(52) U.S. Cl.
CPC .......... *H04L 63/068* (2013.01); *H04L 9/0891* (2013.01); *H04L 63/0428* (2013.01); *H04N 21/4627* (2013.01); *H04N 21/63775* (2013.01); *H04N 21/6587* (2013.01); *H04W 12/04* (2013.01)

(58) Field of Classification Search
None
See application file for complete search history.

(56) References Cited

PUBLICATIONS

CASM: A Content-Aware Protocol for Secure Video Multicast. Yin et al. IEEE(Apr. 2006).*
Rate-sensitive leverage of QoS and QoP for ubiquitous video streaming via buffer-aware feedback control. Wang et al. Multimedia Tools Appl(2014).*
Buffer Occupancy Feedback Security Control and Changing Encryption Keys to Protect MOD Services. Lai et al. LNCS(2006).*
High security data embedding in video. Navas et al. IEEE(2011).*
Key Management Schemes for Peer-to-Peer Multimedia Streaming Overlay Networks. Naranjo J.A.M. et. al. LNCS(2009).*

* cited by examiner

*Primary Examiner* — Venkat Perungavoor
(74) *Attorney, Agent, or Firm* — Weaver Austin Villeneube & Sampson LLP (57) ABSTRACT

Techniques are described by which decryption key rotation may be accomplished to support the protection of live streaming content. During playback of content using a decryption key, the client begins acquisition of a second stream of the same content (including a new decryption key) such that the client can transition playback of the content from the first stream to the second with few or no visible artifacts from the viewer's perspective.

23 Claims, 4 Drawing Sheets

LIVE STREAM ENCRYPTION

BACKGROUND

Live streaming content includes channels or feeds with scheduled content (e.g., premium movie channels) or live broadcasts (e.g., sporting events, news, etc.). Unlike video-on-demand (VOD) assets, live streaming content typically does not have a distinct end point and may continue indefinitely. This presents a challenge in terms of protecting the content from unauthorized access in that, as time passes, the encryption protection of live streaming content can become compromised. The protection of live streaming content in satellite and cable systems is typically done using symmetric key encryption in conjunction with a digital rights management (DRM) system in which decryption keys are changed at regular intervals. Such key rotation intervals vary considerably (e.g., every few seconds to every few minutes) and are typically managed by dedicated DRM hardware (e.g., in a set top box). However, while such an approach may be appropriate for satellite and cable systems, it is not well suited to support the consumption of live streaming content over the Internet by a diverse range of connected devices. In addition, because such techniques rotate keys to facilitate playback of a single stream, there can be challenges in effecting the transition without visible artifacts.

DETAILED DESCRIPTION

This disclosure describes techniques by which decryption key rotation may be accomplished to support the protection of live streaming content consumed by a wide range of device types over the Internet. When a client sends a request to a content service to connect to live content, the client receives everything it needs to stream the requested content including a decryption key that is associated with a particular range of the content. Before playback of the content goes beyond the range of the decryption key and during playback of the content using the decryption key, the client begins acquisition of everything it needs to establish a connection to a second stream of the same content (including a new decryption key) such that the client can transition playback of the content from the first stream to the second with few or no visible artifacts from the viewer's perspective. That is, access is provided to multiple protected outputs for given live content for which the ranges of content associated with the keys are offset (and potentially overlapping). An example may be illustrative.

Figure 1:
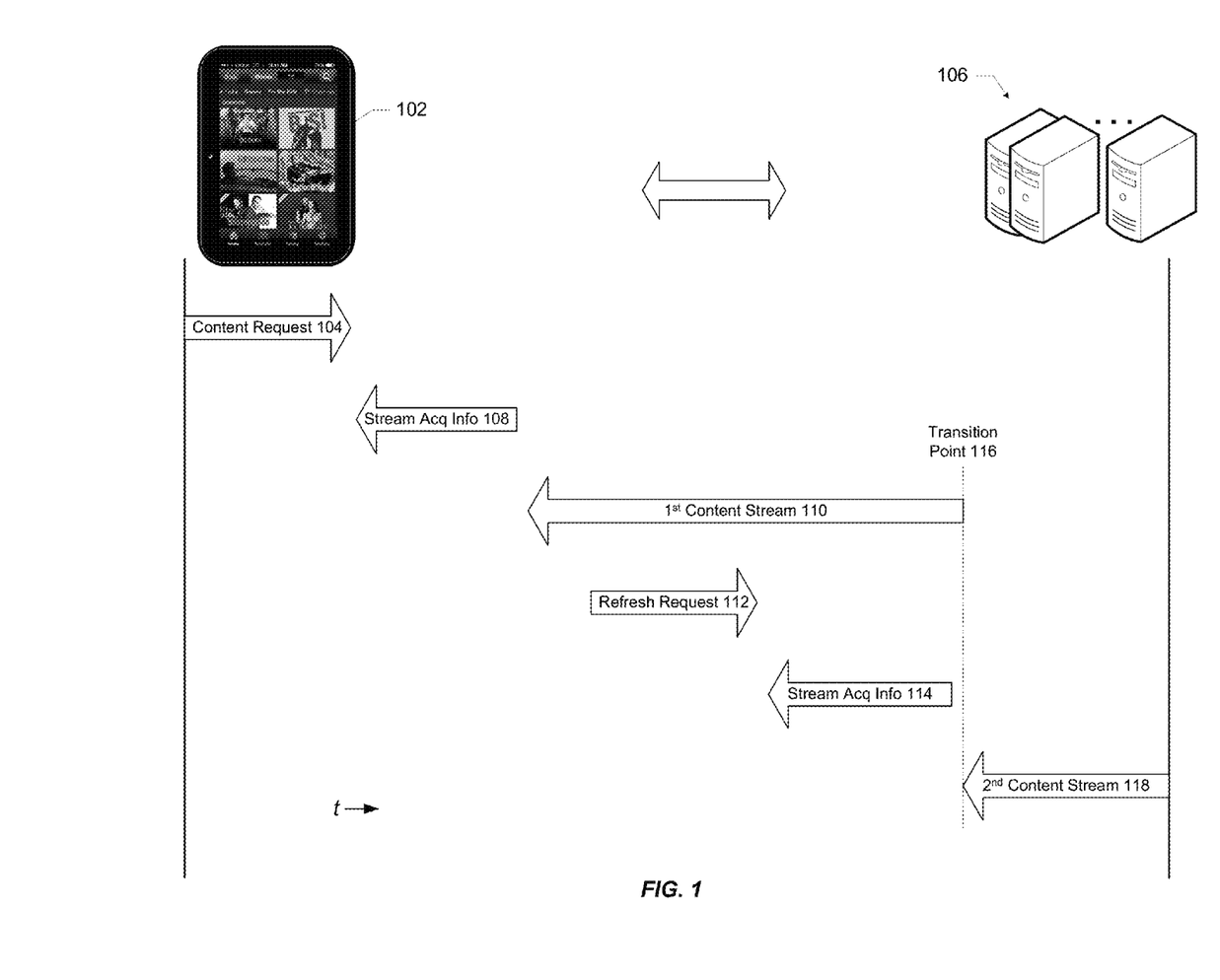
FIG. 1 illustrates an example of decryption key rotation in accordance with a particular implementation.

FIG. 1 illustrates an example in which a client device 102 (in this case a tablet) sends a request 104 to a content service 106 to connect to a broadcast channel in which the content is scheduled and ongoing. Content service 106 provides information 108 to client 102 for establishing the connection including, for example, a uniform resource locator (URL) for a network end point from which the content can be streamed, any necessary DRM licenses, a manifest file, etc. Information 108 also includes a decryption key and may also include a key rotation notification to client 102 regarding the range of the content for which the key is valid (e.g., a frame index or range of indices). Client 102 uses information 108 to connect with and begin consumption of the content via a live content stream 110.

During playback of the content using decryption key (as represented by the overlap of arrow 110 with arrows 112 and 114), and possibly triggered or scheduled by client 102 in response to the key rotation information, client 102 sends a content refresh request 112 to content service 106 for the same content (possibly to the same end point), in response to which content service 106 provides information 114 that client 102 needs to establish a new stream to the content (similar to information 108). Client 102 then transitions playback (at transition point 116) from the existing stream to new stream 118 in a way that is preferably imperceptible or at least difficult for the viewer to visibly detect (e.g., perhaps a slight flickering or a minor buffering event). As will be discussed, the transition may be done at a point in the content that is predetermined based on its suitability for mitigating or eliminating visible artifacts associated with the transition. This process may be repeated to rotation to successive keys.

Figure 2:
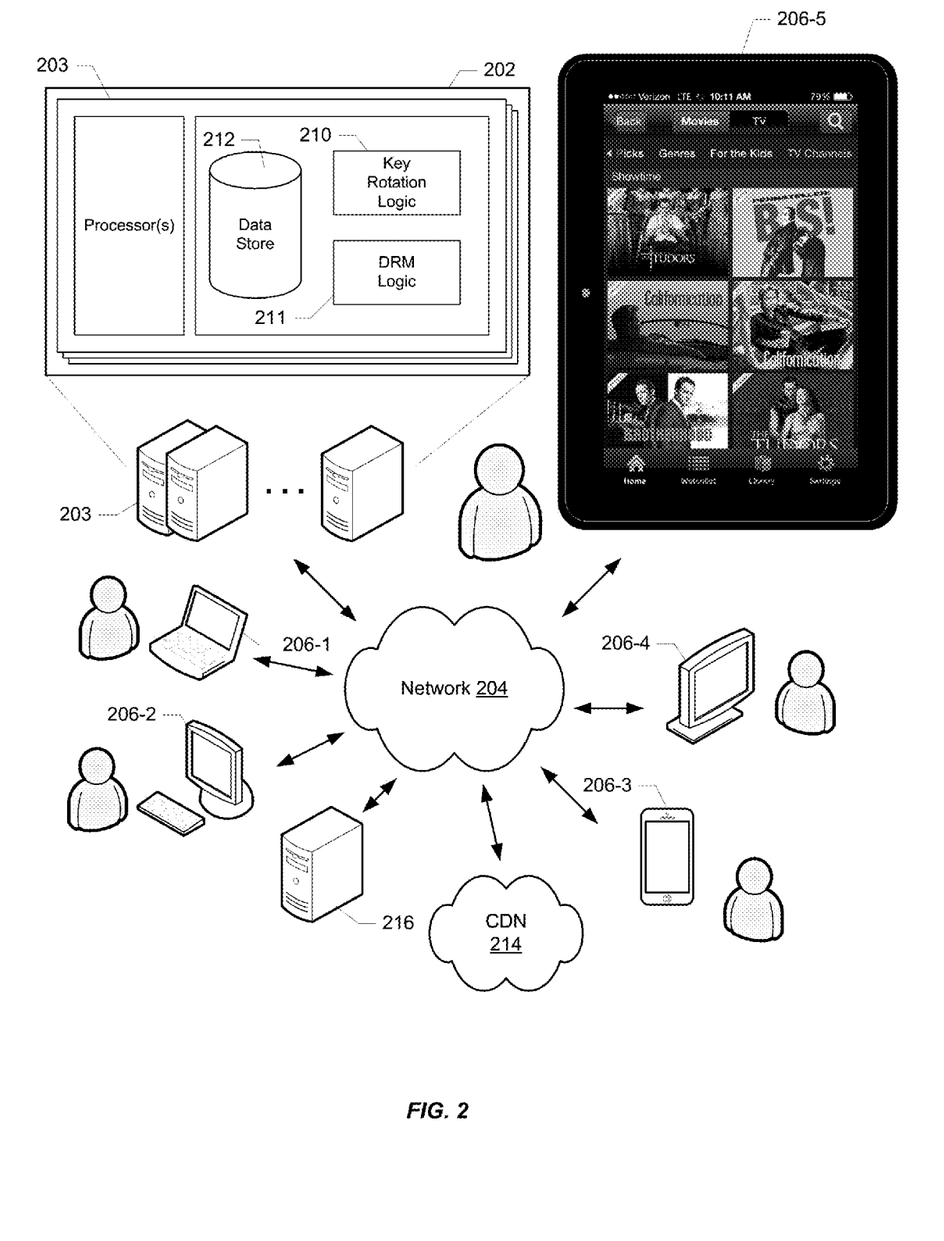
FIG. 2 is a simplified diagram of an example of a network computing environment in which various implementations may be practiced.

FIG. 2 illustrates an example of a computing environment in which a video content service 202 provides live streaming content (e.g., audio or video) via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming live streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols, encryption techniques, or DRM systems herein are merely by way of example. Suitable alternatives known to those of skill in the art may be employed.

In the following examples and for the sake of simplicity, content service 202 is described as if it were integrated with the platform(s) that provides the live streaming content to client devices. Alternatively, content service 202 may provide access to live streaming content in conjunction with one or more content delivery networks (e.g., CDN 214) that may or may not be independent of content service 202. The range of variations known to those of skill in the art are contemplated to be within the scope of this disclosure.

Some of the implementations enabled by the present disclosure contemplate logic resident on the client devices consuming live streaming content from content service 202; such logic being configured to make decisions in conjunction with consuming the video content such as, for example, scheduling and/or triggering acquisition of a new content stream and/or selecting the point at which to transition playback of one stream to another. The logic might be part of an existing algorithm or module on the client device or implemented to work in conjunction with such an algorithm or module. The logic might be implemented, for example, in a media player on the client device or as a separate application or module resident on the client device. It should also be noted that implementations are contemplated in which content service 202 includes logic that facilitates at least some aspects of the delivery of live streaming content as described herein (e.g., as represented by key rotation logic 210). For example, such logic, which may work in conjunction and/or be integrated to varying degrees with an associated DRM system (e.g., DRM logic 211), might notify the client of the range of content for which a key is valid, or determine and provide information to the client about one or more suitable transition points for transitioning playback according to the techniques described herein.

In addition to providing access to the live streaming content, content service 202 may also include a variety of information related to the live streaming content (e.g., associated metadata and manifest files) in data store 212 to which service 202 provides access. Alternatively, such information about the live streaming content, as well as the live streaming content itself may be provided and/or hosted by one or more separate platforms, e.g., CDN 214. It should be noted that, while logic 210 and data store 212 are contemplated as integrated with content service 202, implementations are contemplated in which either or both operate remotely from the associated content service, and/or either or both are under the control of an independent entity. From these examples, those of skill in the art will understand the diversity of use cases to which the techniques described herein are applicable.

Figure 3:
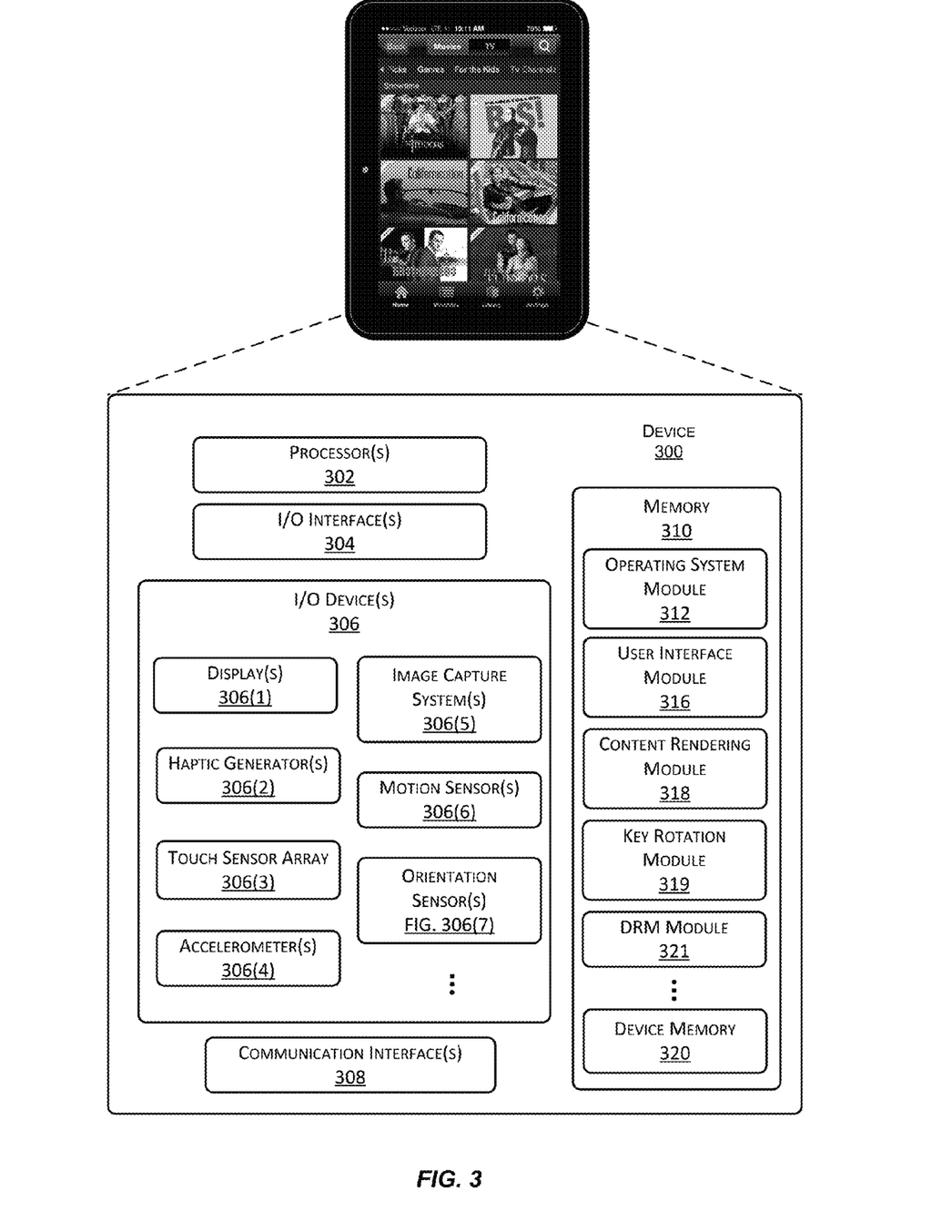
FIG. 3 is a simplified block diagram of an example of a client device with which various implementations may be practiced.

A block diagram of an example of a client device 300 suitable for use with various implementations is shown in FIG. 3. Device 300 includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. The I/O device(s) 306 may include one or more displays 306(1), one or more haptic generators 306(2), a touch sensor array 306(3), one or more accelerometers 306(4), one or more image capture systems 306(5), one or more motion sensors 306(6), one or more orientation sensors 306(7), microphones, speakers, and so forth. The one or more displays 306(1) are configured to provide visual output to the user and may comprise any of a variety of display types including, for example, any type of reflective or transmissive display. Touch sensor array 306(3) may be any of a variety of arrays configured to determine the location, duration, speed and direction of touch events on or near the device's display.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic or computer program instructions used to support decryption key rotation as described herein (represented by key rotation module 319) may be implemented in a variety of ways. For example, at least some of this functionality may be implemented as part of the code of a media player operating on device 300. Alternatively, module 319 may be implemented separately from the device's media player. The functionality of key rotation module 319 may also work in conjunction with and/or be integrated to varying degrees with the DRM system employed by the client (e.g., DRM module 321).

And as mentioned above, implementations are contemplated in which at least a portion of the logic or computer program instructions may reside on a separate platform, e.g., service 202, CDN 214, server 216, etc. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
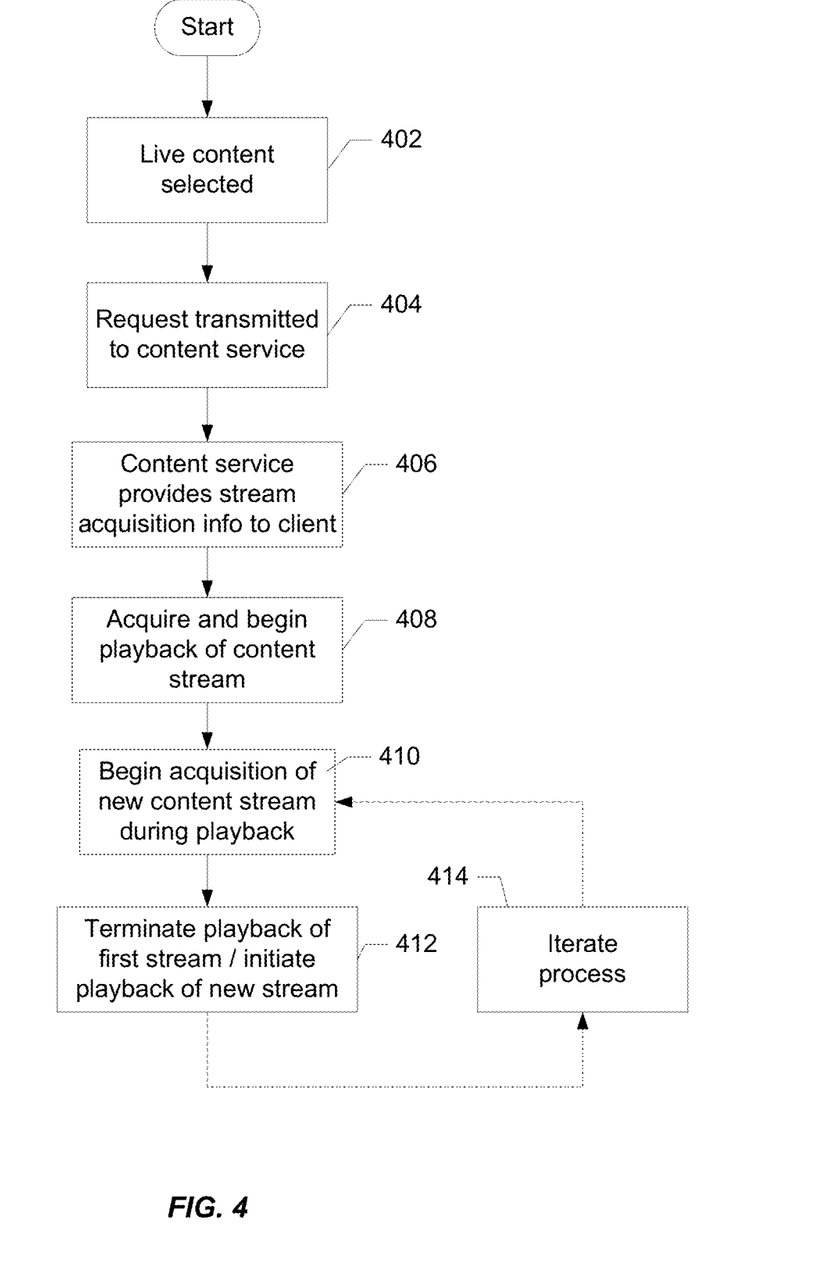
FIG. 4 is a flowchart illustrating operation of a particular implementation.

The delivery of live streaming content to a client device according to a particular implementation is illustrated in the flow chart of FIG. 4. This and other examples described herein assume the use of H.264 encoding for video content. However, it will be understood that the basic principles described herein may be employed with any of a variety of video and audio codecs including, for example, MPEG-1, MPEG-2, MPEG-4 Part 2, VC-1, H.263, VP8, VP9, Daala, and H.265 (also commonly referred to as HEVC). The example illustrated in FIG. 4 also assumes a media player on the client device that includes logic (e.g., module 319) configured to manage at least some aspects of key rotation as described herein. Again, these details are merely presented by way of example.

When a user wants to connect with a content service using a client device, the connection is typically achieved through some kind of login process to the service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. Live streaming content is typically delivered in an encrypted stream using any of a variety of encryption technologies including, for example, various Advanced Encryption Standard (AES) and Elliptic Curve Cryptography (ECC) encryption techniques. It should be noted that the techniques described herein are compatible with a wide range of content services, media players, DRM systems, and encryption technologies, the details of which are known to those of skill in the art. The nature and operation of these technologies will therefore not be described in detail to promote clarity.

When a live content channel is selected in a user interface on a client device (402), a request for the content is sent to the corresponding content service (404). The content service provides the client device with the information the client device needs to acquire a stream of the content (406). This may include, for example, DRM licenses, stream metadata, and information about where the client can request the content fragments of the stream at various resolutions (e.g., a manifest). The information provided to the client also includes a decryption key with which the client can decode the encrypted video fragments of the content stream. This example assumes the use of symmetric-key encryption in which the same key is used for both encryption and decryption, or in which only a simple transformation is required to go from one key to the other.

According to a particular implementation, the information provided to the client also includes key rotation information regarding the range of content for which the decryption key may be used. The nature of this key rotation information and the manner in which it is provided may vary considerably. For example, it may be delivered at the time the client is acquiring the content stream, e.g., in the stream metadata or in association with the key itself. It may also be provided in a separate communication (initiated by either the client or the server) after streaming of the content begins. It may be included in playback details acquired by the client regarding the current content stream. It can be transmitted as a sideband communication from the server to the client at any point during playback of the stream. It may specify a specific range of the content or a range of time during which the key is may be used, or even a time at which the key expires. It may be expressed in terms of a variety of scales including, for example, the local time in the geographic area of the client, an internal time reference of the client, time stamps or other indices associated with the content, etc. In some implementations, the key rotation information might be represented by a trigger or notification sent to the client that acquisition of a new content stream should begin. It should also be noted that implementations are contemplated in which keys don't expire (e.g., remain valid for their specified range of content), and may even be reused (e.g., become associated with subsequent content ranges).

Regardless of how key rotation information is provided to the client, and/or whether it is provided in connection with acquisition of the content stream, the client uses the information provided by the content service to acquire and begin playback of the content stream using the decryption key provided (408). Before playback of the content goes outside the range of the decryption key and while playback is ongoing, the client begins acquisition of another stream for the content (410). As mentioned above, this may be scheduled/or and triggered by the client (e.g., using key rotation information provided by the content service), or triggered by the content service. The request is for the same live content and may be to the same network end point from which the first content stream is being received, or may be to another server of the content service.

The point in the content at which the client begins acquisition of the new content stream relative to the content range of the current decryption key may vary for different implementations. In general, it is desirable to have the acquisition begin early enough such that playback of the new content stream can be initiated prior to the end of the content range of the current key. However, as will be discussed and depending on the implementation, other factors may come into play that result in initiation of stream acquisition such that playback of the new content stream can begin at one or more predetermined transition points prior to the end of the content range of the current key.

According to some implementations, such a transition point may be determined and/or selected to reduce or eliminate the perceptibility of the transition between streams from the viewer's perspective. The nature of the transition point may depend on the type of content. A transition point might be determined or derived using information about the content that is provided by the content provider. For example, content providers often provide information (e.g., content stream metadata) about events or breaks in content (e.g., commercial breaks, breaks between blocks of content, beginning or end of scheduled content, beginning of important live content, etc.) that may present suitable opportunities for making the transition. Such events or breaks might include a fade to black, a few black frames, or content that is less important to viewers (e.g., credits). Black frames can be particularly advantageous for a transition to a new content stream in that they are likely to be visually indistinguishable from one stream to the other even when offset in time. And in the event such a transition results in a buffering event, the buffering animation typically presented on the device display can be suppressed to reduce the likelihood that the transition would be perceptible (i.e., because the black frames are indistinguishable).

Once the client has acquired sufficient information to begin playback of the new content stream (e.g., DRM licenses, new decryption key, manifest, initial content fragments, etc.), playback of the first content stream can be terminated and playback of the second content stream initiated (412), preferably such that the transition from one stream to the other is imperceptible or at least difficult to detect visually. As discussed above, this may be facilitated by causing the transition to be at a predetermined transition point in the content. The process can then be repeated to handle the transition to each successive decryption key (414).

According to some implementations, information about one or more suitable transition points may be provided to the client. As with key rotation information, the nature of such transition point information and the manner in which it is provided may vary considerably. For example, it may be delivered at the time the client is acquiring the content stream, in a separate (e.g., sideband) communication after streaming of the content begins, in playback details associated with the current content stream, etc. It may be expressed in terms of the local time in the geographic area of the client, an internal time reference of the client, time stamps or indices associated with the content, etc. And as with the key rotation information, it might be a communicated with a trigger or notification sent to the client that acquisition of a new content stream should begin. In fact, implementations are contemplated in which key rotation information and transition point information are communicated together and may even be one and the same. For example, the content service might track playback of the content for a current key and send a communication to the client at an appropriate time that acquisition of the next content stream should begin and/or that playback should transition at a specific time or content time stamp or index.

According to some implementations, the playback transition may be specified in terms of and/or effected based on content fragment indices. That is, both content streams correspond to the same underlying content which is typically acquired as a sequence of content fragments requested by the client. The playback transition from one stream to the other could therefore be done by initiating playback of the n+1 fragment of the second stream immediately following the nth fragment of the first. Implementations are also contemplated that take a more granular approach in which the transition may be specified at or effected based on the Group of Pictures (GOP) unit within a fragment.

According to some implementations, a less precise approach to effecting the transition can be employed rather than using consecutive fragments or GOPs. For example, if the transition point corresponds to a relatively long segment (e.g., 3 seconds) of black frames, playback of the second content stream can be initiated further along in the sequence of fragments or GOPs than the point at which playback of the first content stream is terminated. In another example, if the transition point corresponds to an advertisement, the entire ad could be skipped or even replaced, with playback of the second stream beginning at an appropriate point to enable that.

According to some implementations, the occurrence of visual artifacts or buffering events that might otherwise be associated with switching playback from one stream to another can be mitigated by beginning playback of the second stream such that one or more fragments, GOPs, or frames from the first stream are repeated. That is, if it is determined that transition at a particular transition point is likely to cause such an event, or if one actually occurs, playback of the second stream can be initiated at a point that corresponds to a point in the first stream prior to the point at which playback of the first stream was terminated. In that case, while the transition will likely be perceptible, the viewer is not missing any of the content.

For various implementations, content time stamps or indices may be useful for specifying transition points, marking events, and/or triggering actions in that, for any given live content stream, the time stamps or indices for given points in the content are often known in advance (e.g., often a day or more). And for implementations in which there are multiple options for transition points, the client may be implemented (e.g., key rotation module 319) to select from among the options based on any of a variety of factors. For example, the client could monitor local and global network conditions to avoid transitions under sub-optimal conditions (e.g., in which the transition would likely cause a buffering event). In another example, the client could be aware of an upcoming bit-rate transition signaled by a variable-bit-rate algorithm at which the quality of video playback might improve or degrade and select its key rotation transition point accordingly. In another example, the client might become aware of an upcoming event, e.g., the end of a content segment, that either obviates the need for key rotation, or supports a decision to transition earlier rather than later. In another example, the client might monitor the complexity of the video frames or fragments to avoid a transition during, for example, a busy action scene. Those of skill in the art will understand the wide range of other information the client might use based on the diversity of these examples.

As discussed above, the available options may be high-confidence transition points such as, for example, commercial breaks, credits, fades/cuts to black, or the beginnings or ends of content blocks. These are high-confidence in that they increase the likelihood that the transition will not be visually perceptible and there may also be a relatively high degree of reliability in the timing of such events as identified by the content provider. As will be appreciated, such transition points may be relatively far out into the future (e.g., several hours) and thus may be communicated to the client well in advance. They may also be distributed throughout the content, providing a variety of opportunities for making the transition.

Alternatively, transition points may be identified to the client much closer to the point at which the transition actually needs to be made. For example, the client could be notified during playback of the stream of one or more suitable transition points approaching in the next few minutes at which the client can begin playback of the second stream. In some implementations, identification of suitable transition points may be based on real-time or near-real-time video inspection and analysis, identifying upcoming transition points that may only be seconds in the future. For example, video fragments, GOPs, and individual video frames can be analyzed to determine whether they are black frames, or correspond to scenes in which the display images do not appreciably change for an extended period of time. As should be appreciated, such an approach may be particularly important for live streams that do not follow a strict schedule, e.g., live sporting events in which commercial breaks or the end of the program is determined by play on the field.

Implementations are contemplated in which combinations of these approaches are possible. For example, high-confidence transition points may be identified using information from the content provider, but may also be identified dynamically (e.g., from video inspection). This might be useful, for example, in the context of a 24-hour news channel in which a schedule of events from the content provider might be modified on the fly because of breaking news. Clients would then be able to use dynamically generated transition points in place of previously scheduled transition points which may no longer be valid.

According to some implementations, identification of transition points may be done by the client (e.g., key rotation module 319) with reference to either or both of information from the content provider (e.g., in stream metadata), or by inspection of the fragments or frames of the current stream as they are received. For example, as mentioned above, the client might be configured to identify low-complexity or static scenes (e.g., by virtue of the relationships or dependencies among frames in a GOP) as possible transition points. This might be done instead of or in addition to identification of transition points on the server side.

In implementations in which the client is configured to decide among a number of transition points, the decision making power of the client can be systematically curtailed as the end of the content range of the current key approaches. For example, if the end of the content range for the current key is still relatively far off and there are several suitable intervening transition points, the client may be allowed to decide autonomously as to whether an approaching transition point will be used. On the other hand, if the end of the content range is imminent, the client may be forced to select one of the remaining options, or the transition point might even be dictated to the client (by logic on either the client or server side).

In addition to improving the customer experience by reducing or eliminating visual artifacts associated with key rotation, the techniques described herein can allow distribution of the processing load of key rotation on back end systems. That is, conventional approaches to key rotation typically switch all current streams for a given channel to new streams during a short time interval (typically a few minutes). This results in a massive processing load spike. Using techniques described herein, such a load can be spread out over much longer periods of time (e.g., hours) by providing transition point options for different subsets of clients that correspond to different points in the content.

The spreading of the load could be done by explicitly constraining the options for the different subsets of clients. It could also be done in reliance on the fact that a set of clients that are given multiple options for transition points are statistically likely to select suitable transition points in a desirable distribution. The statistical distribution could be biased in some way by relying on contextual factors that would favor certain clients and/or client-stream combinations having certain characteristics selecting some transition points over others, e.g., certain device types, screen sizes, or stream resolutions might favor one type of transition point over another.

While the subject matter of this application has been described with reference to specific implementations thereof, it will be understood by those skilled in the art that changes in the form and details of the disclosed implementations may be made without departing from the spirit or scope of the invention. For example, another use case for techniques described herein is transitioning a set of clients from one network end point to another. For example, as back end resources are upgraded or replaced, current streams on existing resources may need to be transitioned to new instances. Simply waiting for traffic on an existing resource to taper off may not be ideal as it can represent significant unused capacity as a particular resource's load nears zero. By identifying transition points to clients as described herein, migration to new resources could be accelerated because when requests for the new stream from the existing end point are received, they can be redirected to the new resource.

Examples of some of the implementations described herein are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed with reference to particular implementations, it will be understood that the scope of the invention should not be limited by reference to such advantages. Rather, the scope of the invention should be determined with reference to the appended claims.

What is claimed is:

1. A computer-implemented method, comprising:
   receiving an initial request for broadcast content from a client;
   providing a first decryption key to the client;
   initiating a first stream of the broadcast content to the client for playback by the client using the first decryption key;
   providing key rotation information for the first decryption key to the client, the key rotation information representing a content range for which the first decryption key may be used;
   providing transition information to the client, the transition information identifying one or more transition points in the broadcast content prior to an end of the content range for transitioning playback of the broadcast content away from the first stream of the broadcast content;
   receiving a refresh request for the broadcast content from the client while the first stream is being transmitted;
   providing a second decryption key to the client; and
   initiating a second stream of the broadcast content to the client for playback by the client using the second decryption key and beginning at or near one of the transition points prior to the end of the content range.

2. The method of claim 1, wherein the one or more transition points are derived from content metadata provided by a content provider of the broadcast content.

3. The method of claim 1, wherein the one or more transition points are derived from analysis of fragments or frames of the broadcast content.

4. The method of claim 1, wherein each of the one or more transition points is selected to reduce or eliminate visual artifacts associated with the transitioning from the first stream to the second stream.

5. A computer-implemented method, comprising:
   transmitting, by a client device, a first request for first content;
   receiving, at the client device, a first decryption key;
   acquiring, by the client device, a first stream of the first content using the first decryption key;

receiving, at the client device, key rotation information representing a content range for which the first decryption key may be used;

transmitting, by the client device, a second request for the first content during playback of the first stream;

receiving, at the client device, a second decryption key;

acquiring, by the client device, a second stream of the first content using the second decryption key; and initiating, by the client device, playback of the second stream of the first content prior to an end of the content range.

6. The method of claim 5, further comprising receiving, at the client device, transition information representing one or more transition points in the first content for transitioning playback of the first content from the first stream to the second stream.

7. The method of claim 6, wherein the one or more transition points comprise a plurality of transition points, the method further comprising selecting a first transition point from among the plurality of transition points, playback of the second stream being initiated at the first transition point.

8. The method of claim 7, wherein selection of the first transition point is done based on a either predetermined load balancing scheme or local contextual data.

9. The method of claim 6, wherein the one or more transition points are derived from one or more of content metadata provided by a content provider of the first content, or analysis of fragments or frames of the first content.

10. The method of claim 6, further comprising analyzing fragments or frames of the first content to determine an additional transition point in the first content.

11. The method of claim 5, wherein initiating playback of the second stream causes a portion of the first content included in playback of the first stream to be repeated.

12. The method of claim 5, wherein the second stream is acquired from a different network end point than the first stream.

13. The method of claim 5, further comprising determining, by the client device, one or more transition points in the first content for transitioning playback of the first content from the first stream to the second stream.

14. The method of claim 13, wherein the one or more transition points are derived from one or more of content metadata provided by a content provider of the first content, or analysis of fragments or frames of the first content.

15. The method of claim 5, wherein transmission of the second request is responsive to the key rotation information.

16. The method of claim 5, wherein the key rotation information is received in conjunction with acquisition of the first stream.

17. A system, comprising one or more computing devices configured to:

receive a first request for first content from a client;

provide a first decryption key to the client;

initiate a first stream of the first content to the client for playback by the client using the first decryption key;

provide transition information to the client representing one or more transition points in the first content for transitioning playback of the first content away from the first stream prior to an end of a content range associated with the first decryption key;

receive a second request for the first content from the client while the first stream is being transmitted;

provide a second decryption key to the client; and initiate a second stream of the first content prior to the end of the content range using the second decryption key.

18. The system of claim 17, wherein the one or more transition points provided to the client comprise a first transition point, the one or more computing devices being further configured to select the first transition point from among a plurality of transition points based on a predetermined load balancing scheme.

19. The system of claim 17, wherein the one or more transition points are derived from one or more of content metadata provided by a content provider of the first content, or analysis of fragments or frames of the first content.

20. The system of claim 17, wherein at least one of the transition points corresponds to repetition of a portion of the first content included in playback of the first stream.

21. The system of claim 17, wherein the one or more computing devices are configured to initiate the second stream from a different network end point than the first stream.

22. The system of claim 17, wherein the one or more computing devices are further configured to provide key rotation information to the client representing the content range.

23. The system of claim 22, wherein the key rotation information is provided in conjunction with the first decryption key.

* * * * *